United States Patent
Yin et al.

(10) Patent No.: US 10,727,939 B2
(45) Date of Patent: Jul. 28, 2020

(54) COMMUNICATION METHOD, OPTICAL LINE TERMINAL, AND OPTICAL NETWORK UNIT IN PASSIVE OPTICAL NETWORK SYSTEM

(71) Applicant: HUAWEI TECHNOLOGIES CO., LTD., Shenzhen, Guangdong (CN)

(72) Inventors: Jinrong Yin, Shenzhen (CN); Dianbo Zhao, Johannesburg (ZA); Sulin Yang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/552,703

(22) Filed: Aug. 27, 2019

(65) Prior Publication Data

US 2019/0386743 A1    Dec. 19, 2019

Related U.S. Application Data

(63) Continuation of application No. PCT/CN2017/075232, filed on Feb. 28, 2017.

(51) Int. Cl.
*H04B 10/272* (2013.01)
*H04B 10/079* (2013.01)
(Continued)

(52) U.S. Cl.
CPC .......... *H04B 10/0795* (2013.01); *H04B 10/40* (2013.01); *H04J 14/0242* (2013.01); *H04L 61/6022* (2013.01)

(58) Field of Classification Search
CPC .................. H04Q 11/0067; H04B 10/272
See application file for complete search history.

(56) References Cited

U.S. PATENT DOCUMENTS

2009/0080891 A1    3/2009  Kazawa et al.
2009/0196606 A1*   8/2009  Miyagi .............. H04Q 11/0067
                                                            398/45
(Continued)

FOREIGN PATENT DOCUMENTS

CN    101471836 A    7/2009
CN    102075240 A    5/2011
(Continued)

OTHER PUBLICATIONS

Frank J Effenberger Motorola Networks United States of America:"Updated Revised Amendment 1 to G.984.3, Gigabit-capable Passive Optical Networks(G-PON): Transmission Convergence Layer Specification(for consent);TD 157(PLEN/15)", vol. 2/15, May 16, 2005, pp. 1-39, XP017561191.

(Continued)

*Primary Examiner* — Shi K Li
(74) *Attorney, Agent, or Firm* — Womble Bond Dickinson (US) LLP

(57) ABSTRACT

This application discloses a communication method, an optical line terminal, and an optical network unit in a passive optical network system. The PON system includes an OLT and at least one ONU, and the method includes: receiving, by the OLT, a first message that is sent by a first ONU in the at least one ONU through a first upstream channel; determining a first round trip time (RTT) of the first ONU based on a receiving moment of the first message; determining a time window based on the first RTT; sending first indication information to the first ONU through a downstream channel, where the first indication information includes the time window; receiving a second message that is sent by the first ONU through a second upstream channel within the time window; and determining a second RTT of the first ONU based on a receiving moment of the second message.

16 Claims, 9 Drawing Sheets

(51) Int. Cl.
  *H04B 10/40* (2013.01)
  *H04J 14/02* (2006.01)
  H04L 29/12 (2006.01)

(56) References Cited

U.S. PATENT DOCUMENTS

| | | |
|---|---|---|
| 2012/0121253 A1 | 5/2012 | Zhang et al. |
| 2012/0230675 A1 | 9/2012 | Zhang et al. |
| 2013/0266306 A1* | 10/2013 | Kozaki .............. H04Q 11/0067 398/5 |
| 2013/0272699 A1 | 10/2013 | Liang |
| 2019/0273975 A1 | 9/2019 | Lin et al. |

FOREIGN PATENT DOCUMENTS

| | | |
|---|---|---|
| CN | 102075820 A | 5/2011 |
| CN | 102687427 A | 9/2012 |
| CN | 102883234 A | 1/2013 |
| CN | 104426625 A | 3/2015 |
| EP | 2448152 A1 | 5/2012 |
| WO | 9705718 A1 | 2/1997 |
| WO | 2014071309 A2 | 5/2014 |

OTHER PUBLICATIONS

Luca Bertignono et al, Photon Ranging for Upstream ONU Activation Signaling in TWDM-PON. Journal of Lightwave Technology, vol. 34, No. 8, Apr. 15, 2016, 8 pages.

* cited by examiner

COMMUNICATION METHOD, OPTICAL LINE TERMINAL, AND OPTICAL NETWORK UNIT IN PASSIVE OPTICAL NETWORK SYSTEM

CROSS-REFERENCE TO RELATED APPLICATIONS

This application is a Continuation of International Application No. PCT/CN2017/075232, filed on Feb. 28, 2017, the disclosure of which is hereby incorporated by reference in its entirety.

TECHNICAL FIELD

This application relates to the field of optical communications, and more particularly, to a communication method, an optical line terminal, and an optical network unit in a passive optical network system.

BACKGROUND

A passive optical network (PON) is a point-to-multipoint network topology, and usually includes an optical line terminal (OLT) device located at a central office, a plurality of optical network unit (ONU) devices located at a user end, and an optical distribution network (ODN) located between the OLT device and the plurality of ONU devices.

In the PON system, due to the point-to-multipoint network topology, a newly-added ONU device can send upstream service data to the OLT device through an upstream channel only after completing registration and activation at the OLT device. For an Ethernet passive optical network (EPON) system, an OLT device receives, by opening a quiet window, a registration response packet sent by a newly-added ONU device through an upstream channel, to assign a logical link identifier (LLID) to the newly-added ONU device based on a media access control (MAC) address carried in the registration response packet, and complete ranging for the newly-added ONU device. For a gigabit-capable passive optical network (GPON) system, an OLT device receives, by opening a quiet window, a registration response packet sent by a newly-added ONU device, to assign an ONU ID based on a serial number (SN) carried in the registration response packet, and further complete ranging for the newly-added ONU device.

After completing registration, registered ONU devices send upstream service data to the OLT device through the upstream channel through time division multiple access (TDMA) in upstream sending timeslots assigned by the OLT device, to avoid a conflict, between upstream service data sent by the different ONU devices, on the upstream channel. In addition, to avoid a conflict between the registration response packet and the upstream service data on the upstream channel, during registration of the newly-added ONU device, the OLT stops granting bandwidth to the registered ONU device. In particular, the registered ONU stops sending upstream service data.

In the PON system, the registered ONU device can send the upstream service data only after the quiet window ends. Consequently, a relatively large delay exists during sending of the upstream service data, and a system delay requirement of a low delay service cannot be met. Therefore, an effective solution urgently needs to be provided to eliminate a delay caused by windowing activation for the ONU.

SUMMARY

Embodiments of this application provide a communication method, an optical line terminal (OLT), and an optical network unit (ONU) in a passive optical network (PON) system, so that a delay caused by windowing activation can be effectively reduced, implementation is easy, and costs are reduced.

According to one embodiment, a communication method in a PON system is provided. The PON system includes an OLT and at least one ONU, and the method includes:

receiving, by the OLT, a first message that is sent by a first ONU in the at least one ONU through a first upstream channel;

determining, by the OLT, a first round trip time (RTT) of the first ONU based on a receiving moment of the first message;

determining, by the OLT, a time window based on the first RTT;

sending, by the OLT, first indication information to the first ONU through a downstream channel, where the first indication information includes the time window;

receiving, by the OLT, a second message that is sent by the first ONU through a second upstream channel within the time window;

determining, by the OLT, a second RTT of the first ONU based on a receiving moment of the second message; and completing, by the OLT, a registration operation of the first ONU based on the second RTT.

According to the communication method in the PON system in one embodiment of this application, the OLT receives the first message that is sent by the first ONU in the at least one ONU through the first upstream channel; determines the first RTT of the first ONU based on the receiving moment of the first message; determines the time window based on the first RTT; instructs the first ONU to perform registration within the time window; and obtains the precise second RTT, so that a delay caused by windowing activation can be effectively reduced, implementation is easy, and costs are reduced.

In one embodiment of this application, the first RTT is a round trip time between the OLT and the first ONU. In one embodiment, the first RTT may include a downstream transmission delay, a response time of the first ONU, and an upstream transmission delay.

In one embodiment of this application, the first ONU is an ONU that does not register with a PON, or may be referred to as an unregistration ONU.

In one embodiment of this application, the OLT may calculate the round trip time RTT between the first ONU and the OLT based on the moment at which the first message is received, to approximately estimate a measurement distance of the ONU, or approximately determine a location of the ONU. The OLT may calculate the time window based on the measurement distance, and the time window may also be referred to as a registration window. Herein, the OLT no longer needs a time window of 250 µs corresponding to a distance of 20 km, but recalculates a smaller time window based on the measurement distance. The time window is smaller, and therefore less affects a delay of a normal service of another online ONU.

In one embodiment of this application, the second message may include registration information.

In one embodiment, a frequency domain resource corresponding to the second upstream channel is different from a frequency domain resource corresponding to the first upstream channel.

In one embodiment of this application, the first upstream channel may also be referred to as an upstream registration channel, and the second upstream channel may also be referred to as an upstream service channel. For example, the first message sent by the first ONU may be sent through the upstream registration channel. The "upstream registration channel" introduced herein may be a channel that is separated from the upstream service channel in frequency domain. In one embodiment, the first message of the ONU is sent through the upstream registration channel of the ONU by using a frequency band of 0 to 10 MHz, and a data service of the ONU is sent through the upstream service channel by using a frequency band of greater than or equal to 10 megahertz MHz. Alternatively, for example, in a 10G PON system, the first message of the ONU is sent through the upstream registration channel of the ONU by using a frequency band of greater than 10 gigahertz GHz, and a data service is sent through the upstream service channel by using a frequency band of 0 to 10 GHz. Herein, the upstream service channel and the upstream registration channel are separated in frequency domain, so that mutual interference between the upstream service channel and the upstream registration channel can be greatly reduced.

In one embodiment, the first message may be an unmodulated optical signal or a modulated optical signal. In one embodiment, when the first message is the unmodulated optical signal (for example, may be a pulse signal that emits light for a very short time), the OLT may determine, by detecting strength of the unmodulated optical signal, whether the first ONU sends the first message. In one embodiment, when detecting that the strength of the optical signal exceeds a threshold, the OLT may consider that the ONU sends the first message.

Herein, a signal that emits light for a very short time may be used as the first message, in other words, the first ONU may send data within a very short timeslot. Therefore, when there are a plurality of unregistration ONUs, compared with a signal that emits light for a longer time or emits light continuously, the signal that emits light for a very short time may be used to greatly reduce a probability that a plurality of unregistration ONUs are in conflict with each other, thereby reducing impact on a data channel.

In one embodiment, the first message may carry or may not carry content of the first ONU. This is not limited.

In one embodiment, before the receiving, by the OLT, a first message that is sent by a first ONU in the at least one ONU through a first upstream channel, the method further includes:

sending, by the OLT, second indication information to the first ONU through the downstream channel, where the second indication information is used to instruct the first ONU to perform registration; and the receiving, by the OLT, a first message that is sent by a first ONU in the at least one ONU through a first upstream channel includes:

receiving, by the OLT, the first message that is sent by the first ONU through the first upstream channel and that is in response to the second indication information.

Herein, the first message may be understood as a message with which the first ONU responds to the indication information. In one embodiment, when delivering the indication information, the OLT may also deliver bandwidth allocation information to another possible online ONU.

In one embodiment, when the OLT sends the first indication information to the first ONU through the downstream channel, the method further includes:

sending, by the OLT, a grant resource to a second ONU in the at least one ONU through the downstream channel, where a time domain unit corresponding to the grant resource is staggered from a time domain unit corresponding to the time window; and receiving, by the OLT, upstream service data sent by the second ONU through the second upstream channel.

Herein, because the time window of the first ONU is staggered from a bandwidth grant of the online ONU, registration of the first ONU on the upstream service channel does not interfere with receiving of the service data of the online ONU.

The time window in this embodiment of this application is no longer the window of 250 µs corresponding to 20 km in the prior art, but is a window smaller than the window of 250 µs, and therefore less affects a delay of the service data of the online ONU.

In one embodiment, the first message is an optical signal, and the optical signal carries a serial number (SN) or a media access control (MAC) address of the first ONU.

In one embodiment, the completing, by the OLT, a registration operation of the first ONU based on the second RTT includes:

sending, by the OLT, a compensation delay or a bandwidth grant to the first ONU through the downstream channel based on the second RTT, so that the first ONU completes the registration operation.

In one embodiment, the OLT may send, to the first ONU through the downstream channel, bandwidth map (BW-MAP) grant information or a discovery grant message that is used to instruct the first ONU to perform registration.

In one embodiment, the OLT may further simultaneously deliver BWMAP grant information or a normal grant message that is used to instruct the second ONU to perform service communication.

According to one embodiment, a communication method in a passive optical network system is provided. The PON system includes an OLT and at least one ONU, and the method includes:

sending, by a first ONU in the at least one ONU, a first message to the OLT through a first upstream channel, where the first message is used by the OLT to determine a first RTT of the first ONU based on a receiving moment of the first message;

receiving, by the first ONU, first indication information sent by the OLT through a downstream channel, where the first indication information includes a time window, and the time window is determined by the OLT based on the first RTT;

sending, by the first ONU, a second message through a second upstream channel within the time window, where the second message is used by the OLT to determine a second RTT of the first ONU based on a receiving moment of the second message; and registering, by the first ONU, with the PON system based on the time window.

According to the communication method in the PON system in one embodiment of this application, the first ONU sends the first message to the OLT, where the first message is used by the OLT to determine the first RTT of the first ONU; receives the time window sent by the first ONU; and performs registration within the time window, so that the OLT calculates the precise second RTT. Therefore, a delay caused by windowing activation can be effectively reduced.

In one embodiment, a frequency domain resource corresponding to the second upstream channel is different from a frequency domain resource corresponding to the first upstream channel.

In one embodiment, before the sending, by a first ONU, a first message to the OLT through a first upstream channel, the method further includes:

receiving, by the first ONU, second indication information sent by the OLT through the downstream channel, where the second indication information is used to instruct the first ONU to perform registration; and the sending, by a first ONU, a first message to the OLT through a first upstream channel includes:

sending, by the first ONU to the OLT through the first upstream channel, the first message that is in response to the second indication information.

In one embodiment, the registering, by the first ONU, with the PON system based on the time window includes:

receiving, by the first ONU, a compensation delay or a bandwidth grant that is sent by the OLT through the downstream channel, to complete a registration operation.

According to one embodiment, an OLT in a passive optical network is provided. The OLT includes a receiver, a transmitter, and a processor, and is configured to perform the method described in the disclosure.

According to one embodiment, an ONU in a passive optical network is provided. The ONU includes a receiver, a transmitter, and a processor, and is configured to perform the method described in the disclosure.

According to one embodiment, an OLT in a passive optical network is provided, and is configured to perform the method described in the disclosure. In one embodiment, the apparatus includes units configured to perform the method described in the disclosure.

According to one embodiment, an ONU in a passive optical network is provided, and is configured to perform the method described in the disclosure. In one embodiment, the apparatus includes units configured to perform the method described in the disclosure.

According to one embodiment, a computer-readable storage medium is provided. The computer-readable storage medium stores a program, and the program enables an OLT to perform the communication method in the PON system described in the disclosure.

According to one embodiment, a computer-readable storage medium is provided. The computer-readable storage medium stores a program, and the program enables an ONU to perform the communication method in the passive optical network PON system described in the disclosure.

DESCRIPTION OF EMBODIMENTS

The following describes technical solutions in embodiments of this application with reference to accompanying drawings.

Figure 1:
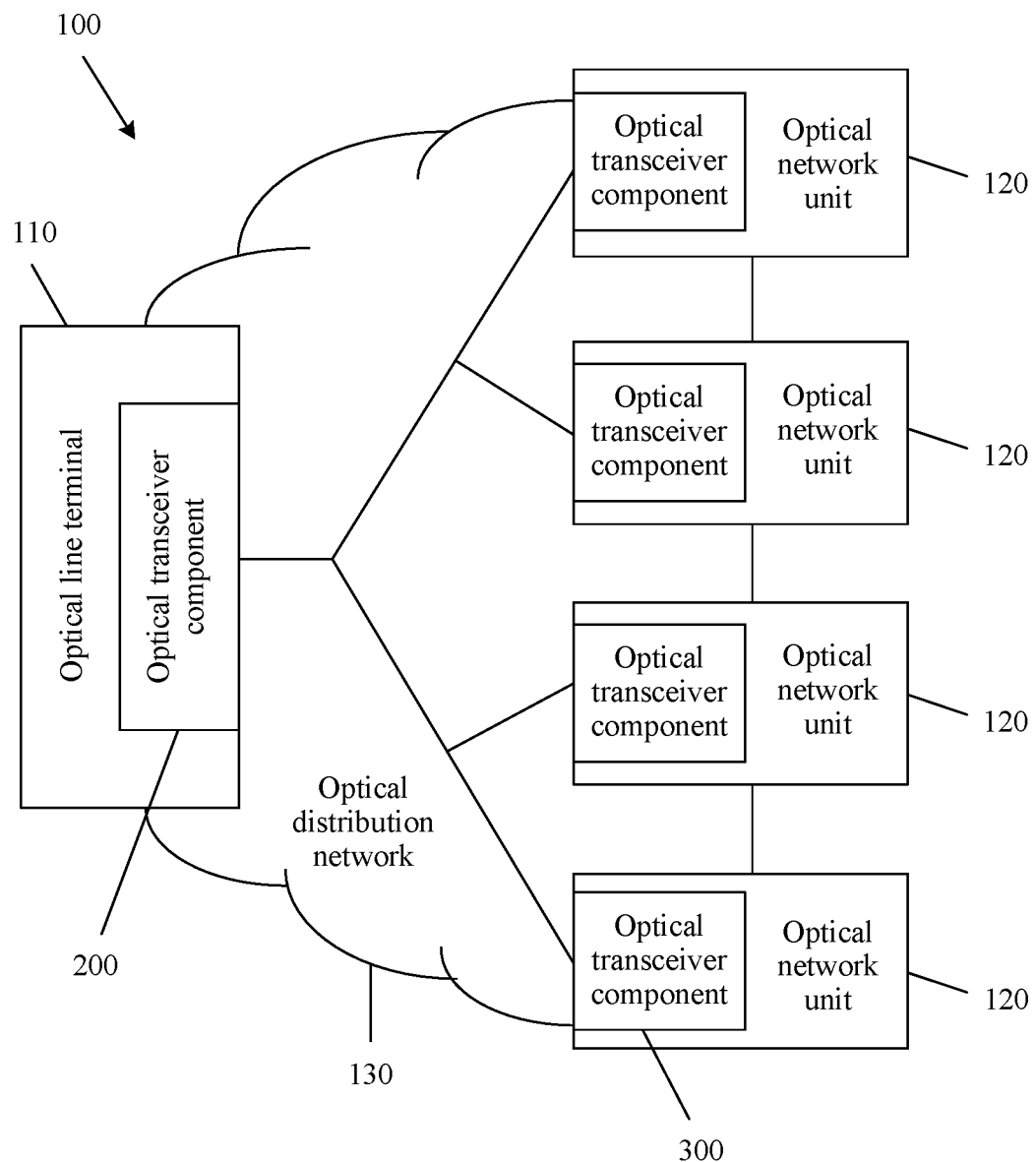
FIG. 1 is an architectural diagram of a system according to an embodiment of this application.

FIG. 1 is a schematic block diagram of a PON system 100 of a network architecture to which an embodiment of this application is applied. The PON system 100 includes at least one OLT 110, a plurality of ONUs 120, and one ODN 130. The optical line terminal 110 is point-to-multipoint connected to the plurality of optical network units 120 over the optical distribution network 130. The optical line terminal 110 may communicate with the optical network units 120 by using a time division multiplexing (TDM) mechanism, a wavelength division multiplexing (WDM) mechanism, or a TDM/WDM hybrid mechanism. A direction from the optical line terminal 110 to the optical network unit 120 is defined as a downstream direction, and a direction from the optical network unit 120 to the optical line terminal 110 is defined as an upstream direction.

The passive optical network system 100 may be a communications network in which no active component is required for implementing data distribution between the optical line terminal 110 and the optical network unit 120. In one embodiment, the data distribution between the optical line terminal 110 and the optical network unit 120 may be implemented by using a passive optical component (for example, an optical splitter) in the optical distribution network 130. The passive optical network system 100 may be an asynchronous transfer mode passive optical network (ATM PON) system or a broadband passive optical network (BPON) system that is defined in the ITU-T G.983 standard; a gigabit passive optical network (GPON) system defined in the ITU-T G984 series standard; an Ethernet passive optical network (EPON) system, a wavelength division multiplexing passive optical network (WDM-PON) system, or a next generation passive optical network (NGPON) system that is defined in the IEEE 802.3ah standard, for example, a 10-gigabit-capable passive optical network (XG-PON) system defined in the ITU-T G987 series standard, or a 10 G EPON system, a time division multiplexing passive optical network (TDM-PON), or a TDM/WDM hybrid PON system that is defined in the IEEE 802.3av standard; a future 25G PON, 50G PON, or 100G PON system; and the like. All content of the various passive optical network systems defined in the foregoing standards is incorporated in this application by reference in its entirety.

The optical line terminal 110 is usually located at a central position, for example, a central office (CO). The optical line terminal 110 can centrally manage the plurality of optical network units 120. The optical line terminal 110 can function as a medium between the optical network unit 120 and an upper-layer network (not shown in the figure), to forward data received from the upper-layer network to the optical network unit 120 as downstream data, and forward upstream data received from the optical network unit 120 to the upper-layer network. A structural configuration of the optical line terminals 110 may vary with a type of the passive optical network system 100. In one embodiment, the optical line terminal 110 may include an optical transceiver component 200 and a data processing module (not shown in the figure). The optical transceiver component 200 can convert downstream data processed by the data processing module into a downstream optical signal, and send the downstream optical signal to the optical network unit 120 over the optical distribution network 130; and receive an upstream optical signal sent by the optical network unit 120 over the optical distribution network 130, convert the upstream optical signal into an electrical signal, and provide the electrical signal for the data processing module for processing.

The optical network units 120 may be disposed at a user-side location (for example, customer premises) in a distributed manner. The optical network unit 120 may be a network device used for communication between the optical line terminal 110 and a user. In one embodiment, the optical network unit 120 may function as a medium between the optical line terminal 110 and the user. For example, the optical network unit 120 may forward downstream data received from the optical line terminal 110 to the user, and forward data received from the user to the optical line terminal 110 as upstream data. A structural configuration of the optical network unit 120 may vary with the type of the passive optical network system 100. In one embodiment, the optical network unit 120 may include an optical transceiver component 300. The optical transceiver component 300 is configured to: receive a downstream data signal sent by the optical line terminal 110 over the optical distribution network 130, and send an upstream data signal to the optical line terminal 110 over the optical distribution network 130. It should be understood that in this application, a structure of the optical network unit 120 is similar to a structure of an ONT. Therefore, in the solutions provided in this application, the optical network unit and the optical network terminal are interchangeable.

The optical distribution network 130 may be a data distribution system, and may include an optical fiber, an optical coupler, an optical multiplexer/demultiplexer, an optical splitter, and/or another device. In an embodiment, the optical fiber, the optical coupler, the optical multiplexer/demultiplexer, the optical splitter, and/or another device each may be a passive optical component. In one embodiment, the optical fiber, the optical coupler, the optical multiplexer/demultiplexer, the optical splitter, and/or another device each may be a component that distributes a data signal between the optical line terminal 110 and the optical network unit 120 without requiring power support. In addition, in another embodiment, the optical distribution network 130 may further include one or more processing devices, for example, an optical amplifier or a relay device. In a branch structure shown in FIG. 1, the optical distribution network 130 may extend from the optical line terminal 110 to the plurality of optical network units 120. However, the optical distribution network 130 may be alternatively configured to be in any other point-to-multipoint structure.

It should be understood that FIG. 1 schematically shows only a topology of the PON system. However, this constitutes no limitation on the embodiments of this application, and there may be a multi-level branch in practice.

A communication method in the PON system is proposed in one embodiment of this application. A first upstream channel (which may also be referred to as an upstream registration channel) and a second upstream channel (which also be referred to as an upstream service channel) that are separated in frequency domain are introduced. Registration of a new ONU is completed through the upstream registration channel, and service data is sent through the upstream service channel, so that registration information and the service data can be simultaneously sent. Therefore, a delay caused by windowing activation can be effectively reduced, implementation is easy, and costs are relatively low.

Figure 2:
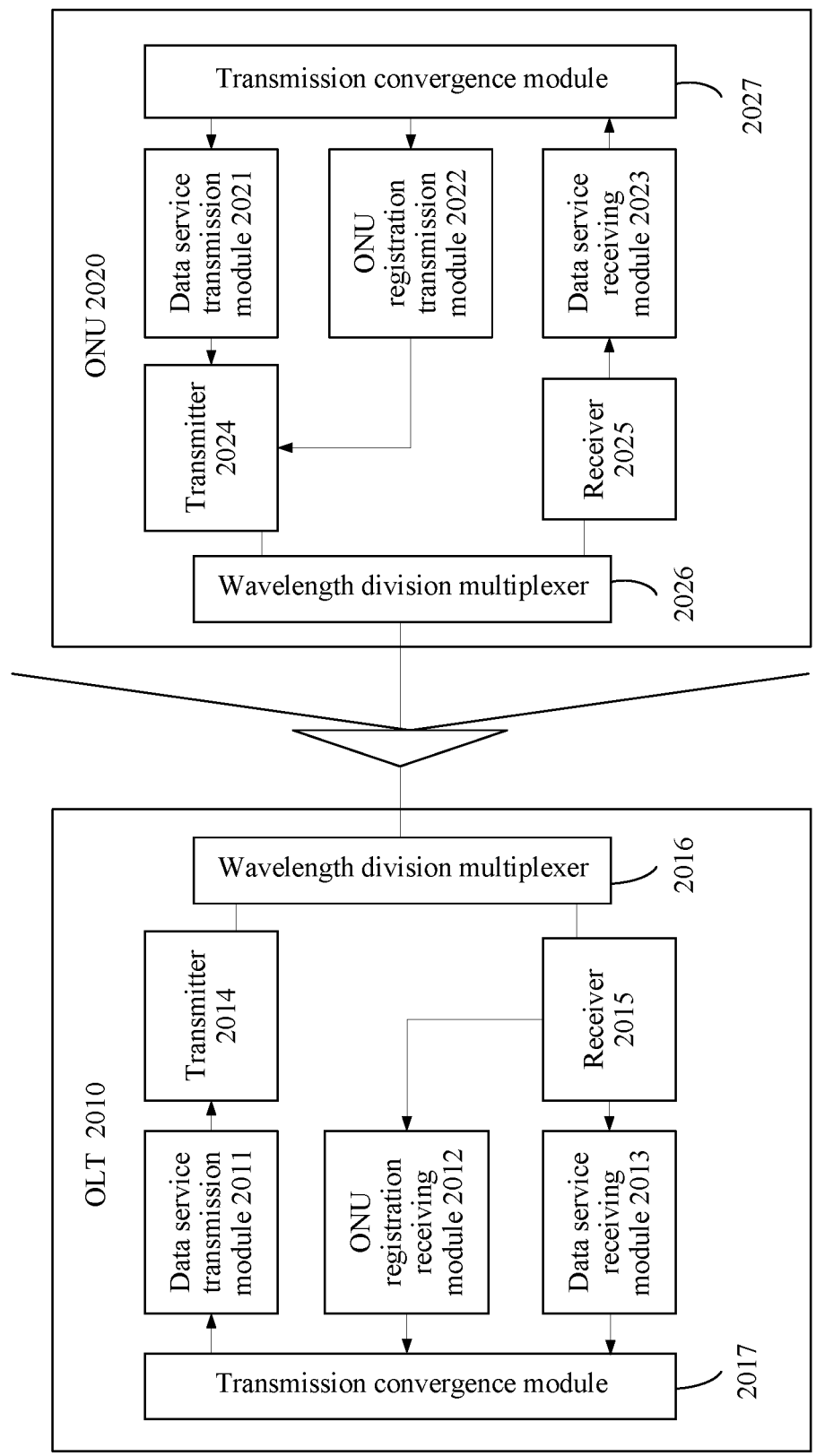
FIG. 2 is a schematic block diagram of an example PON system to which an embodiment of this application is applied.

FIG. 2 is a schematic block diagram of an example PON system to which an embodiment of this application is applied. As shown in FIG. 2, the PON system includes an OLT 2010 and an ONU 2020. There are an upstream service channel, a downstream service channel, and an ONU upstream registration channel in the PON system. A structure of the PON system in FIG. 2 is easy to implement and requires relatively low costs. It should be understood that FIG. 2 is introduced merely for helping a person skilled in the art understand the technical solutions in the embodiments of this application more clearly, and constitutes no limitation on the embodiments of this application.

The OLT 2010 includes a downstream data transmission module 2011, an ONU registration receiving module 2012, a data service receiving module 2013, a downstream transmitter 2014, an upstream burst receiver 2015, a wavelength division multiplexer 2016, and a transmission convergence (TC) module 2017.

The ONU 2020 includes a data service transmission module 2021, an ONU registration transmission module 2022, a downstream data receiving module 2023, an upstream burst transmitter 2024, a downstream receiver 2025, a wavelength division multiplexer 2026, and a transmission convergence module 2027.

In the PON system, an upstream direction and a downstream direction use different wavelengths, and share a same ODN by using the wavelength division multiplexers. For the upstream direction, the ONU registration transmission module 2022 and the transmitter 2024 of the ONU 2020 and the ONU registration receiving module 2012 and the receiver 2015 of the OLT 2010 together constitute an ONU registration channel (or a registration auxiliary channel); and the data service transmission module 2021 and the transmitter 2024 of the ONU 2020 and the data service receiving module 2013 and the receiver 2015 of the OLT 2010 together constitute a service channel (or a data service channel). In addition, the registration channel and the service channel may be separated in frequency domain.

In one embodiment of this application, the modules or hardware structures in the PON system in FIG. 2 may perform the method in the embodiments of this application. The following describes the method according to the embodiments of this application.

Figure 3:
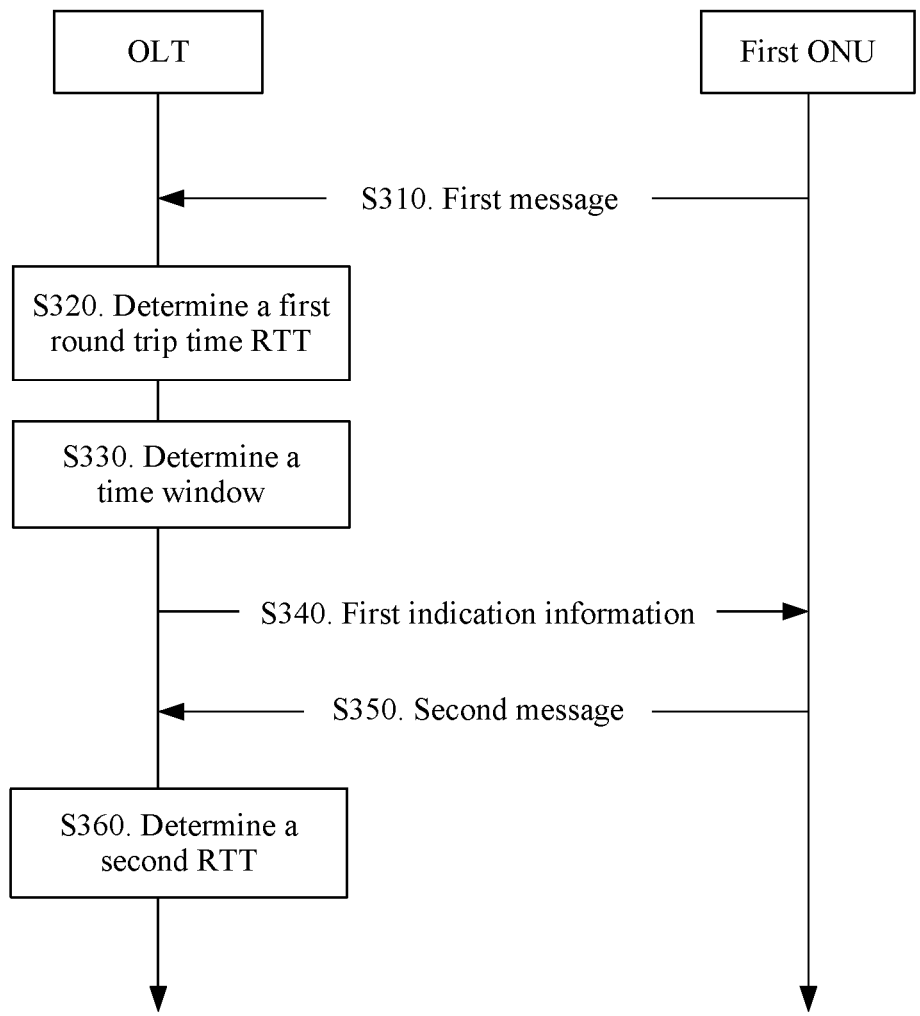
FIG. 3 is a schematic interaction flowchart of a communication method in a PON system according to an embodiment of this application.

FIG. 3 is a schematic interaction flowchart of a communication method in a PON system according to an embodiment of this application. As shown in FIG. 3, the PON system includes an OLT and at least one ONU. The OLT may be the optical line terminal 110 in FIG. 1, and the ONU may be the optical network unit 120 in FIG. 1; or the OLT may be the OLT 2010 in FIG. 2, and the ONU may be the ONU 2020 in FIG. 2. The method may include the following operations.

S310. The OLT receives a first message that is sent by a first ONU in the at least one ONU through a first upstream channel.

Herein, the first ONU is an ONU that does not register with a PON, or may be referred to as an unregistration ONU.

The first upstream channel is used by the OLT to receive the first message sent by the unregistration ONU, to obtain a receiving moment of the first message.

In one embodiment, the first message may be an unmodulated optical signal or a modulated optical signal.

In one embodiment, when the first message is the unmodulated optical signal (for example, may be a pulse signal that emits light for a very short time), the OLT may determine, by detecting strength of the unmodulated optical signal, whether the first ONU sends the first message. In one embodiment, when detecting that the strength of the optical signal exceeds a threshold, the OLT may consider that the ONU sends the first message.

In one embodiment, when the first message is the modulated optical signal, the optical signal may carry an SN or a MAC address of the first ONU. In this way, the OLT may obtain, by demodulating the optical signal, the SN or the MAC address that is carried by the ONU. In one embodiment, the OLT may also perform ONU authentication based on the demodulated SN or MAC address. If the authentication succeeds, the ONU is allowed to continue registration; or if the authentication fails, the ONU no longer continues an ONU registration procedure. Further, the OLT may assign an ONU ID to the ONU based on the SN or the MAC address.

Herein, a signal that emits light for a very short time may be used as the first message, in other words, the first ONU may send data within a very short timeslot (for example, a timeslot of several microseconds). Therefore, when a plurality of ONUs simultaneously perform registration, compared with a signal that emits light for a longer time or emits light continuously, the signal that emits light for a very short time may be used to greatly reduce a probability that a plurality of unregistration ONUs are in conflict with each other, thereby reducing impact on a data channel.

In one embodiment, the first message may carry or may not carry content of the first ONU. This is not limited. In one embodiment, before S310, the method may further include:

sending, by the OLT, second indication information to the first ONU through a downstream channel, where the second indication information is used to instruct the first ONU to perform registration.

S310 includes:

receiving, by the OLT, the first message that is sent by the first ONU through the first upstream channel and that is in response to the indication information.

In one embodiment, the OLT may deliver indication information (for example, the second indication information) to the first ONU in advance, to instruct the first ONU to perform registration. After receiving the second indication information, the first ONU may respond to the second indication information, and in one embodiment, send the first message to the OLT through the first upstream channel. In other words, the first message may be understood as a message with which the first ONU responds to the second indication information.

In one embodiment, the second indication information may include information used by the ONU to perform downstream frame synchronization, ONU registration indication information, operation parameter information of the OLT, and the like.

It should be understood that, in this embodiment of this application, the OLT may simultaneously send indication information to a plurality of ONUs, to instruct the ONUs to perform registration. Herein, only the first ONU is used as an example for description, and this is not limited in this embodiment of this application.

It should be noted that when the OLT delivers the indication information, if there is an online ONU, the OLT may also deliver bandwidth grant information assigned to the online ONU. In other words, through the downstream channel, the OLT may normally assign bandwidth to the online ONU, and simultaneously instruct the first ONU to perform registration.

In one embodiment, in a GPON system, the OLT may simultaneously deliver BWMAP grant information that is used to instruct the first ONU to perform registration and BWMAP grant information that is used to instruct the second ONU to perform service communication. In an EPON system, the OLT may simultaneously deliver a discovery grant message that is used to instruct the first ONU to perform registration and a normal grant message that is used to instruct the second ONU to perform service communication.

S320. The OLT determines a first RTT of the first ONU based on a receiving moment of the first message.

In one embodiment, the first RTT is a round trip time between the OLT and the first ONU. In one embodiment, the first RTT may include a downstream transmission delay, a response time of the first ONU, and an upstream transmission delay.

In one embodiment, the OLT may calculate the first RTT of the first ONU based on the moment at which the first message is received and a start moment at which downstream data is sent. For example, the first RTT may be based on a microsecond magnitude.

In one embodiment, based on the first RTT, the OLT may approximately estimate a measurement distance of the first ONU, or may approximately determine a location of the ONU, for example, may estimate that the ONU is located at a location of hundreds of meters away. In other words, the OLT may estimate the location of the first ONU based on the moment at which the first message of the first ONU is received.

In one embodiment, the measurement distance is represented based on a first distance magnitude, for example, a hundred-meter magnitude.

In other words, a process of S310 and S320 may be referred to as a "rough ranging" process. The "rough ranging" means that the OLT may detect the first message (for example, an optical signal) sent by the first ONU, and determine the first round trip time (namely, the first RTT) of the first ONU, to perform a subsequent operation based on the first round trip time of the first ONU.

In one embodiment, after receiving the first message, the OLT may further assign an identifier ONU ID to the first ONU, to subsequently identify the first ONU.

S330. The OLT determines a time window based on the first RTT.

In one embodiment, the OLT may calculate the time window based on the first RTT or the measurement distance of the first ONU, and the time window may also be referred to as a registration window. Herein, the OLT no longer needs to calculate the time window based on a maximum ONU distance supported in the system (for example, in an existing ranging process, a time window that is calculated based on a maximum ONU distance of 20 km supported in the system is 250 microseconds, and therefore a relatively large delay is introduced), but recalculates a smaller time window based on the first RTT or the measurement distance of the first ONU (for example, the time window may be set to several microseconds in consideration of uncertainty of an ONU processing time and measurement precision of the first RTT). The time window is smaller, and therefore less affects a delay of a normal service of another online ONU.

In other words, in one embodiment of this application, a registration process of the first ONU may also be understood as a rough ranging phase and a precise ranging phase. The time window may be understood as a registration window in the precise ranging phase. In addition, in the precise ranging phase, the time window calculated by the OLT depends on the first RTT or the measurement distance of the first ONU in the rough ranging phase.

S340. The OLT sends first indication information to the first ONU through a downstream channel, where the first indication information includes the time window.

In other words, the OLT may send indication information (for example, the first indication information) to the first ONU, where the indication information includes the time window, so that the first ONU makes a response (e.g., replies with registration information) within the time window. In other words, the OLT sends the first indication information, to instruct the first ONU to make a response within the time window.

S350. The OLT receives a second message that is sent by the first ONU through a second upstream channel within the time window. In one embodiment, a frequency domain resource corresponding to the second upstream channel is different from a frequency domain resource corresponding to the first upstream channel.

In one embodiment of this application, the second message may include the registration information. In one embodiment, the second message may be understood as a message that is used by the first ONU to respond to or reply to the first indication information sent by the OLT.

The OLT may receive the second message with which the first ONU replies within the time window, where the second message includes the registration information, and the second message is sent by the first ONU through the second upstream channel. The second upstream channel and the first upstream channel are separated in frequency domain.

In one embodiment of this application, the first upstream channel may also be referred to as an upstream registration channel, and the second upstream channel may also be referred to as an upstream service channel. For example, the first message sent by the first ONU may be sent through the upstream registration channel. The "upstream registration channel" introduced herein may be a channel that is separated from the upstream service channel in frequency domain. In one embodiment, for example, the first message of the ONU is sent through the upstream registration channel of the ONU by using a frequency band of 0 to 10 MHz, and a data service of the ONU is sent through the upstream service channel by using a frequency band of greater than or equal to 10 megahertz MHz. Alternatively, for example, in a 10G PON system, the first message of the ONU is sent through the upstream registration channel of the ONU by using a frequency band of greater than 10 gigahertz GHz, and a data service is sent through the upstream service channel by using a frequency band of 0 to 10 GHz. Herein, the upstream service channel and the upstream registration channel are separated in frequency domain, so that mutual interference between the upstream service channel and the upstream registration channel can be greatly reduced.

S360. The OLT determines a second RTT of the first ONU based on a receiving moment of the second message.

In one embodiment, the OLT completes a registration operation of the first ONU based on the second RTT.

Further, the OLT may calculate the second RTT based on the receiving moment of the second message, and then perform delay compensation or bandwidth grant based on the second RTT. Herein, the second RTT is a time magnitude more precise than the first RTT. In one embodiment, after calculating the first RTT in the rough ranging phase, the OLT may send the indication information (including the time window) to the first ONU, so that the first ONU replies with a response message (for example, the registration information) within the time window, and the OLT precisely calculates the second RTT based on a moment at which the response message is received.

In one embodiment, the OLT may send a compensation delay or a bandwidth grant to the first ONU through the downstream channel based on the second RTT, so that the first ONU completes the registration operation, to perform normal service communication.

In one embodiment, the OLT may send, to the first ONU through the downstream channel, the BWMAP grant information or the discovery grant message that is used to instruct the first ONU to perform registration.

In one embodiment, the OLT may further simultaneously deliver the BWMAP grant information or the normal grant message that is used to instruct the second ONU to perform service communication.

It should be understood that in one embodiment of this application, after completing registration, the first ONU performs a similar subsequent operation to the online ONU, for example, may send service data through the upstream service channel. Details are not described herein.

It should be further understood that in one embodiment of this application, a number "first", "second", or the like is introduced merely for distinguishing between different objects or terms, for example, distinguishing between different ONUs, or distinguishing between different indication information, and constitutes no limitation on this embodiment of this application.

Therefore, according to the communication method in the PON system in one embodiment of this application, the OLT receives the first message that is sent by the first ONU in the at least one ONU through the first upstream channel; determines the first RTT of the first ONU based on the receiving moment of the first message; determines the time window based on the first RTT; instructs the first ONU to perform registration within the time window; and obtains the precise second RTT, so that a delay caused by windowing activation can be effectively reduced, implementation is easy, and costs are reduced.

Figure 4:
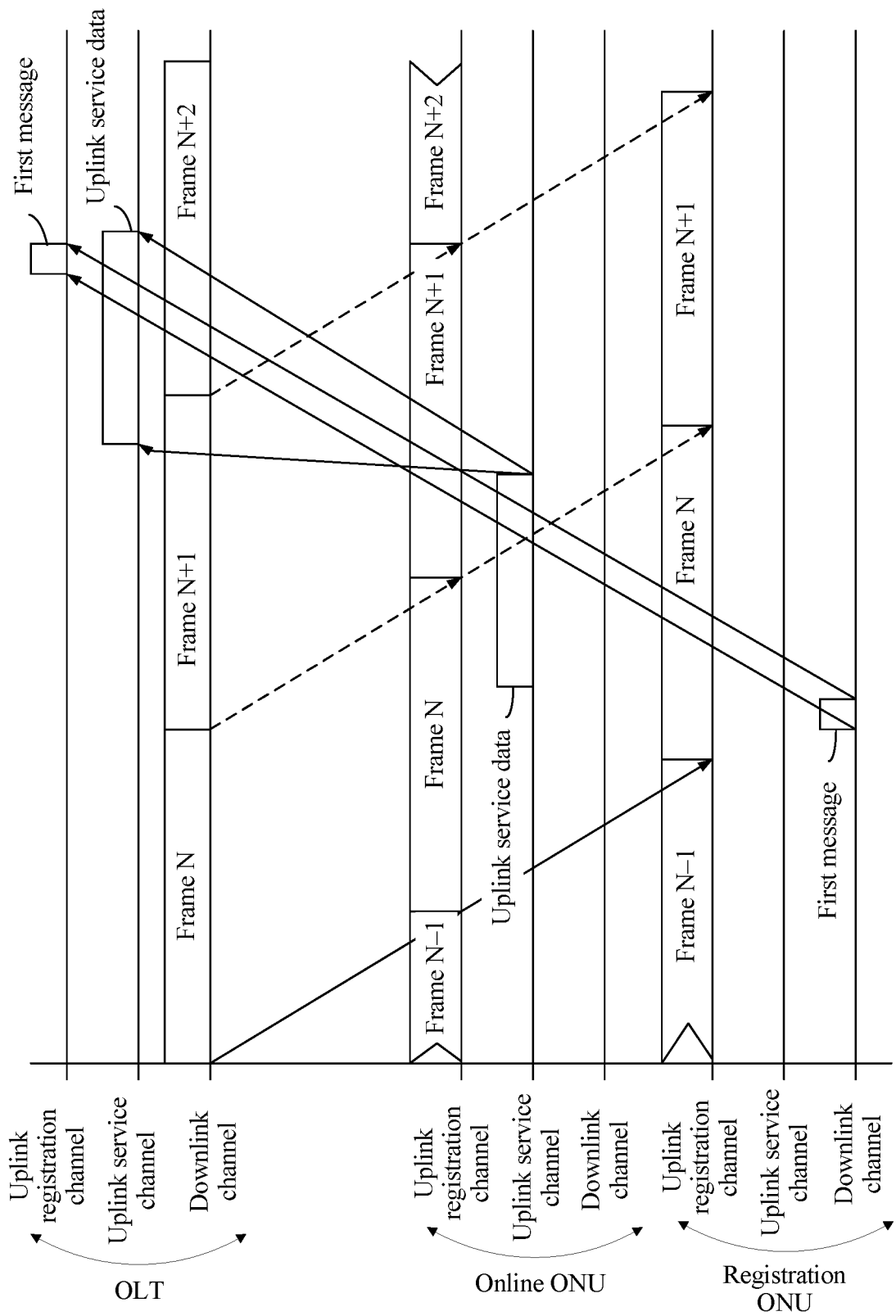
FIG. 4 is a schematic diagram of an example according to an embodiment of this application.

Further, in one embodiment of this application, the foregoing "rough ranging phase and precise ranging phase" may be completed on different upstream channels. Because the upstream registration channel and the upstream service channel are separated in frequency domain, upstream service data of the online ONU and the first message of the first ONU may overlap in terms of time. FIG. 4 is a schematic diagram of an example according to an embodiment of this application. As shown in FIG. 4, an OLT may receive, through an upstream service channel, upstream service data sent by an online ONU (namely, the second ONU), and simultaneously may receive, through an upstream registration channel, a first message sent by a unregistration ONU (namely, the first ONU). The upstream service data of the online ONU and the first message of the unregistration ONU may partially or completely overlap in terms of time.

It should be understood that the example in FIG. 4 is introduced herein merely for helping a person skilled in the art understand the technical solutions of this application, and constitutes no limitation on the embodiments of this application.

Figure 5:
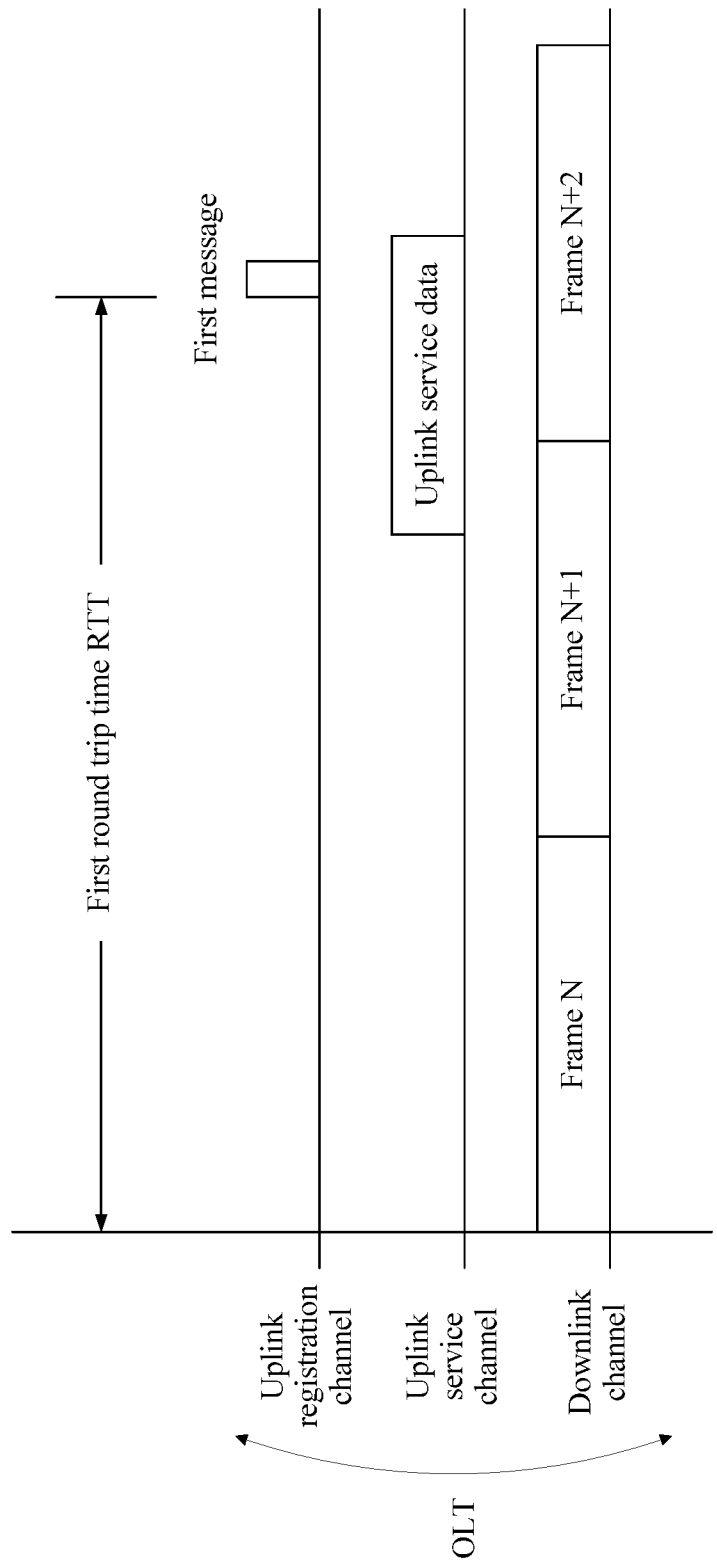
FIG. 5 is a schematic diagram of another example according to an embodiment of this application.

In one embodiment of this application, the OLT may calculate the first round trip time RTT between the OLT and the first ONU based on an arrival moment of the first message and a sending moment of the downstream data. The first RTT may include the downstream transmission delay, the response time of the first ONU, and the upstream transmission delay. For example, FIG. 5 is a schematic diagram of another example according to an embodiment of this application. As shown in FIG. 5, a first round trip time RTT between an OLT and a first ONU that is obtained by the OLT includes a downstream transmission delay X μs, a response time of the first ONU, and an upstream transmission delay X' μs. Herein, the OLT may receive or detect a first message (for example, an optical signal) on an upstream registration channel. When receiving or detecting the optical signal, the OLT may record an arrival moment of the optical signal.

It should be understood that the example in FIG. 5 is introduced herein merely for helping a person skilled in the art understand the technical solutions of this application, and constitutes no limitation on the embodiments of this application.

In one embodiment, when the OLT sends the first indication information to the first ONU through the downstream channel, the method may further include:

sending, by the OLT, a grant resource to a second ONU in the at least one ONU through the downstream channel, where a time domain unit corresponding to the grant resource is staggered from a time domain unit corresponding to the time window; and receiving, by the OLT, upstream service data sent by the second ONU through the second upstream channel.

Herein, the second ONU may be the online ONU.

In one embodiment, the OLT may assign a bandwidth grant to the online ONU through the downstream channel, and the bandwidth grant is staggered from the time window of the first ONU. After receiving the bandwidth grant, the online ONU may send the service data on the upstream service channel. The first ONU may send the registration information (which may include content required for registration) of the first ONU on the upstream service channel. Therefore, the OLT may receive both the service data of the online ONU and the registration information of the first ONU on the upstream service channel, and then precisely calculate the round trip time of the first ONU based on the registration information of the first ONU. Herein, because the time window of the first ONU is staggered from the bandwidth grant of the online ONU, registration of the first ONU on the upstream service channel does not interfere with receiving of the service data of the online ONU.

In addition, through measurement on the first ONU, the OLT has preliminarily determined the first RTT of the first ONU or the measurement distance of the first ONU, and determines the time window (may be referred to as a registration window) of the first ONU based on the first RTT of the first ONU or the measurement distance of the first ONU. The time window is no longer the window of 250 μs corresponding to 20 km in the prior art, but is a window at a μs magnitude, and therefore less affects a delay of the service data of the online ONU.

Figure 6:
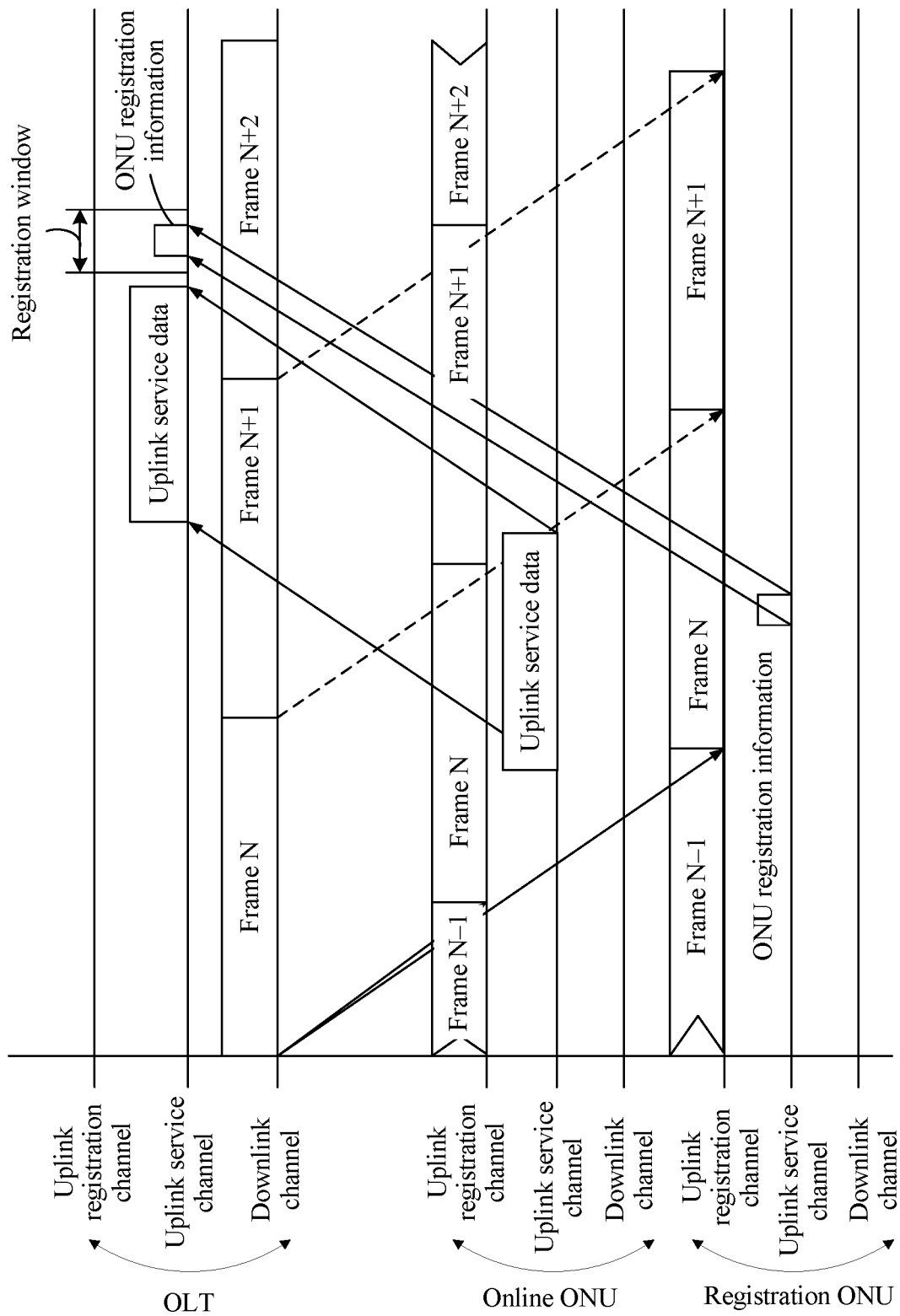
FIG. 6 is a schematic diagram of still another example according to an embodiment of this application.

For example, FIG. 6 is a schematic diagram of still another example according to an embodiment of this application. It may be considered that FIG. 6 shows an example of the precise ranging phase. As shown in FIG. 6, an OLT may open a registration window for an unregistration ONU on an upstream service channel, and avoid the registration window when allocating a bandwidth resource to an online ONU. The OLT may receive, through the upstream service channel, upstream service data sent by the online ONU, and simultaneously may receive, through the upstream service channel, ONU registration information sent by the unregistration ONU (namely, the first ONU). A time at which the online ONU sends the upstream service data is staggered from a time at which the unregistration ONU sends the registration information. Registration of the unregistration ONU does not affect data sending of the online ONU.

It should be understood that the example in FIG. 6 is introduced herein merely for helping a person skilled in the art understand the technical solutions of this application, and constitutes no limitation on the embodiments of this application.

In one embodiment, in the precise ranging phase, the OLT may precisely calculate, based on the ONU registration information, the second round trip time RTT of the unregistration ONU. The second round trip time RTT is a time magnitude more precise than the first round trip time RTT. For example, the second round trip time RTT may be a time represented based on a nanosecond magnitude.

Figure 7:
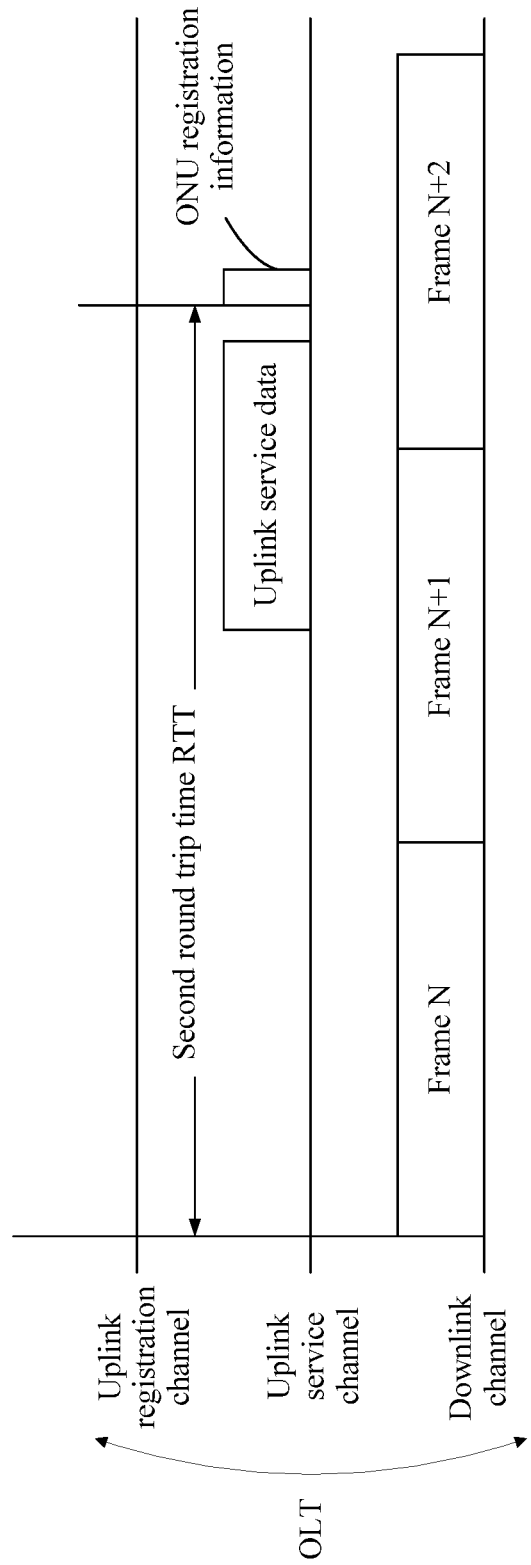
FIG. 7 is a schematic diagram of yet another example according to an embodiment of this application.

FIG. 7 is a schematic diagram of yet another example according to an embodiment of this application. As shown in FIG. 7, an OLT may precisely calculate a second RTT based on a receiving moment of ONU registration information and a sending moment of a downstream data frame. In one embodiment, the second RTT may include a downstream transmission delay (X microseconds μs), a response time of an unregistration ONU, a pre-assigned delay Pre-Assigned Delay, and an upstream transmission delay (X' μs).

Therefore, further, according to the communication method in one embodiment of this application, the grant resource is sent to the second ONU in the at least one ONU, where the time domain unit corresponding to the grant resource is staggered from the time domain unit corresponding to the time window; and the upstream service data sent by the second ONU through the upstream service channel is received. Therefore, registration of the first ONU on the upstream service channel does not interfere with receiving of the service data of the second ONU.

The foregoing describes the method in the embodiments of this application, and the following describes an apparatus in the embodiments of this application.

Figure 8:
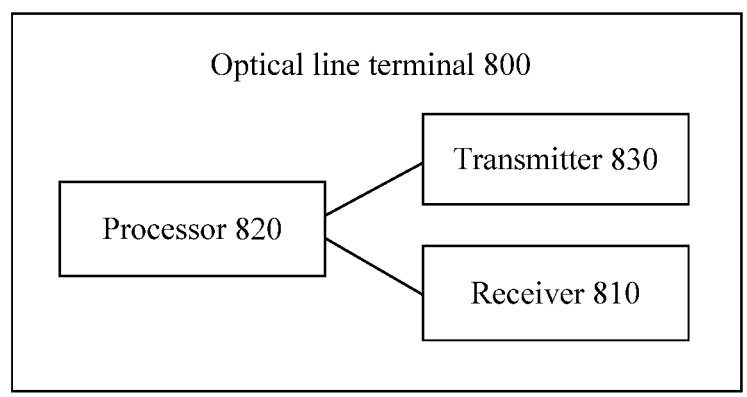
FIG. 8 shows an OLT in a PON system according to an embodiment of this application.

FIG. 8 shows an OLT 800 in a PON system according to an embodiment of this application. The PON system includes the OLT and at least one ONU. As shown in FIG. 8, the OLT 800 includes a transmitter 830, a receiver 810, and a processor 820. The receiver 810 and the transmitter 830 may be connected by using a wavelength division multiplexer.

The receiver 810 is configured to receive a first message that is sent by a first ONU in the at least one ONU through a first upstream channel.

The processor 820 is configured to: determine a first RTT based on a receiving moment of the first message; and determine a time window based on the first RTT.

The transmitter 830 is configured to send first indication information to the first ONU through a downstream channel, where the first indication information includes the time window.

The receiver 810 is further configured to receive a second message that is sent by the first ONU through a second upstream channel within the time window. In one embodiment, a frequency domain resource corresponding to the second upstream channel is different from a frequency domain resource corresponding to the first upstream channel.

The processor 820 is further configured to: determine a second RTT of the first ONU based on a receiving moment of the second message; and complete a registration operation of the first ONU based on the second RTT.

In one embodiment, the receiver 810 and the transmitter 830 in the OLT 800 may include some modules. For example, the receiver 810 may include a receiving module, and the transmitter 830 may include a transmission module. This is not limited in this embodiment of this application.

In one embodiment of this application, the OLT 800 needs only one set of transceiver (the receiver 810 and the transmitter 830) to: receive the first message that is sent by the first ONU in the at least one ONU through the first upstream channel; determine the first RTT of the first ONU based on the receiving moment of the first message; determine the time window based on the first RTT; instruct the first ONU to perform registration within the time window; and obtain the precise second RTT, so that a delay caused by windowing activation can be effectively reduced. The OLT 800 in this embodiment of this application is relatively easy to implement, requires lower costs, has a lower constraint condition of engineering application, and has very high feasibility and operability in engineering commercial application. In one embodiment, the transmitter 830 is further configured to:

send second indication information to the first ONU through the downstream channel, where the second indication information is used to instruct the first ONU to perform registration.

The receiver 810 is configured to:

receive the first message that is sent by the first ONU through the first upstream channel and that is in response to the second indication information.

In one embodiment, the transmitter 830 is further configured to:

send a grant resource to a second ONU in the at least one ONU through the downstream channel, where a time domain unit corresponding to the grant resource is staggered from a time domain unit corresponding to the time window.

The receiver 810 is further configured to receive upstream service data sent by the second ONU through the second upstream channel.

In one embodiment, the processor 820 is configured to:

send a compensation delay or a bandwidth grant to the first ONU through the downstream channel based on the second RTT, so that the first ONU completes the registration operation.

In one embodiment, the first message may be an unmodulated optical signal or a modulated optical signal. In one embodiment, when the first message is the unmodulated optical signal, the first message may be a pulse signal that emits light for a very short time. When the first message is the modulated optical signal, the first message may carry an SN or a MAC address of the first ONU.

The OLT 800 according to one embodiment of this application may perform a method on an OLT side in the embodiments of this application, and the foregoing and other operations and/or functions of the modules in the OLT 800 are separately used to implement corresponding procedures of the foregoing methods. For brevity, details are not described herein again.

Therefore, the OLT 800 in one embodiment of this application receives the first message that is sent by the first ONU in the at least one ONU through the first upstream channel; determines the first RTT of the first ONU based on the receiving moment of the first message; determines the time window based on the first RTT; instructs the first ONU to perform registration within the time window; and obtains the precise second RTT, so that a delay caused by windowing activation can be effectively reduced, implementation is easy, and costs are reduced.

Figure 9:
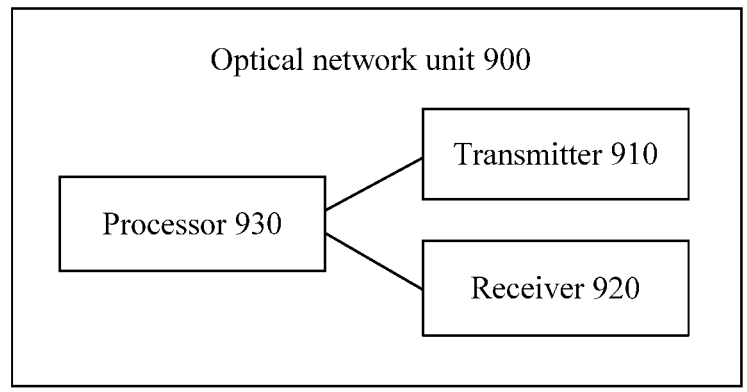
FIG. 9 shows an ONU in a PON system according to an embodiment of this application.

FIG. 9 shows an ONU 900 in a PON system according to an embodiment of this application. The PON system includes an OLT and at least one ONU. The ONU 900 includes a transmitter 910, a receiver 920, and a processor 930. The receiver 920 and the transmitter 910 may be connected by using a wavelength division multiplexer.

The transmitter 910 is configured to send a first message to the OLT through a first upstream channel, where the first message is used by the OLT to determine a first round trip time RTT of the first ONU based on a receiving moment of the first message.

The receiver 920 is configured to receive first indication information sent by the OLT through a downstream channel, where the first indication information includes a time window, and the time window is determined by the OLT based on the first RTT.

The transmitter 910 is further configured to send a second message through a second upstream channel within the time window, where the second message is used by the OLT to determine a second RTT of the first ONU based on a receiving moment of the second message. In one embodiment, a frequency domain resource corresponding to the second upstream channel is different from a frequency domain resource corresponding to the first upstream channel.

The processor 930 is configured to register the ONU with the PON system based on the time window.

In one embodiment, the receiver 920 and the transmitter 910 in the ONU 900 may include some modules. For example, the receiver 920 may include a receiving module, and the transmitter 910 may include a transmission module. This is not limited in this embodiment of this application.

The ONU 900 in one embodiment of this application needs only one set of transceiver, is relatively easy to implement, requires lower costs, has a lower constraint condition of engineering application, and has very high feasibility and operability in engineering commercial application. In addition, the ONU 900 in this embodiment of this application may flexibly implement energy conservation.

In an embodiment, the receiver 920 is further configured to:

receive, by the first ONU, second indication information sent by the OLT through the downstream channel, where the second indication information is used to instruct the first ONU to perform registration.

The transmitter 910 is configured to:

send, to the OLT through the first upstream channel, the first message that is in response to the second indication information.

In an embodiment, the processor 930 is configured to:

receive a compensation delay or a bandwidth grant that is sent by the OLT through the downstream channel, to complete a registration operation.

The ONU 900 in one embodiment of this application may perform a method on a first-ONU side in the embodiments of this application, and the foregoing and other operations and/or functions of the modules in the ONU 900 are separately used to implement corresponding procedures of the foregoing methods. For brevity, details are not described herein again.

Therefore, the ONU 900 in one embodiment of this application sends the first message to the OLT, where the first message is used by the OLT to determine the first round trip time RTT of the first ONU; receives the time window sent by the first ONU; and performs registration within the time window, so that the OLT calculates the precise second RTT. Therefore, a delay caused by windowing activation can be effectively reduced, implementation is easy, and costs can be reduced.

Figure 10:
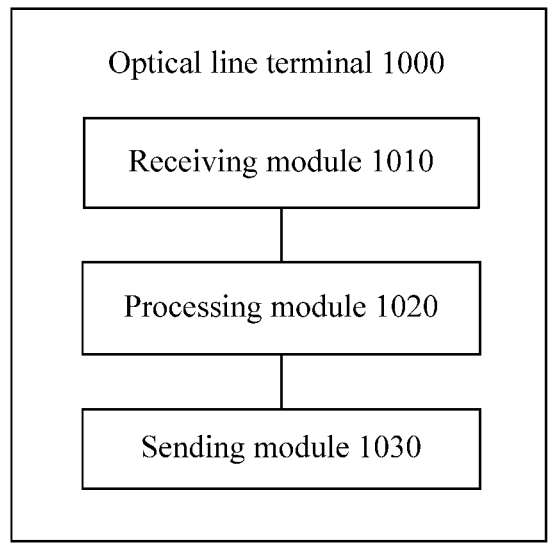
FIG. 10 shows an OLT in a PON system according to another embodiment of this application.

FIG. 10 shows an OLT 1000 in a PON system according to another embodiment of this application. The PON system includes the OLT and at least one ONU. As shown in FIG. 10, the OLT 1000 includes a receiving module 1010, a processing module 1020, and a sending module 1030.

The receiving module 1010 is configured to receive a first message that is sent by a first ONU in the at least one ONU through a first upstream channel.

The processing module 1020 is configured to: determine a first round trip time RTT of the first ONU based on a receiving moment of the first message; and determine a time window based on the first RTT.

The processing module 1020 is further configured to determine the time window based on the first RTT or a measurement distance.

The sending module 1030 is configured to send first indication information to the first ONU through a downstream channel, where the first indication information includes the time window.

The receiving module 1010 is further configured to receive a second message that is sent by the first ONU through a second upstream channel within the time window. In one embodiment, a frequency domain resource corresponding to the second upstream channel is different from a frequency domain resource corresponding to the first upstream channel.

The processing module 1020 is further configured to: determine a second RTT of the first ONU based on a receiving moment of the second message; and complete a registration operation of the first ONU based on the second RTT.

The modules in the OLT 1000 in one embodiment of this application may exist in the foregoing OLT 800. In other words, the OLT 1000 and the OLT 800 may implement this embodiment of this application in a form of combination of software and hardware. This is not limited.

In an embodiment, the sending module 1030 is further configured to:

send, by the OLT, second indication information to the first ONU through the downstream channel, where the second indication information is used to instruct the first ONU to perform registration.

The receiving module 1010 is configured to:

receive, by the OLT, the first message that is sent by the first ONU through the first upstream channel and that is in response to the second indication information.

In an embodiment, the sending module 1030 is further configured to:

send a grant resource to a second ONU in the at least one ONU through the downstream channel, where a time domain unit corresponding to the grant resource is staggered from a time domain unit corresponding to the time window.

The receiving module 1010 is further configured to:

receive, by the OLT, upstream service data sent by the second ONU through the second upstream channel.

In an embodiment, the processing module 1020 is configured to:

send a compensation delay or a bandwidth grant to the first ONU through the downstream channel based on the second RTT, so that the first ONU completes the registration operation.

In an embodiment, the first message is an optical signal, and the optical signal carries a SN or a MAC address of the first ONU.

The OLT 1000 according to one embodiment of this application may perform a method on an OLT side in the embodiments of this application, and the foregoing and other operations and/or functions of the modules in the OLT 1000 are separately used to implement corresponding procedures of the foregoing methods. For brevity, details are not described herein again.

Therefore, the OLT 1000 in one embodiment of this application receives the first message that is sent by the first ONU in the at least one ONU through the first upstream channel; determines the first RTT of the first ONU based on the receiving moment of the first message; determines the time window based on the first RTT; instructs the first ONU to perform registration within the time window; and obtains the precise second RTT, so that a delay caused by windowing activation can be effectively reduced, implementation is easy, and costs are reduced.

Figure 11:
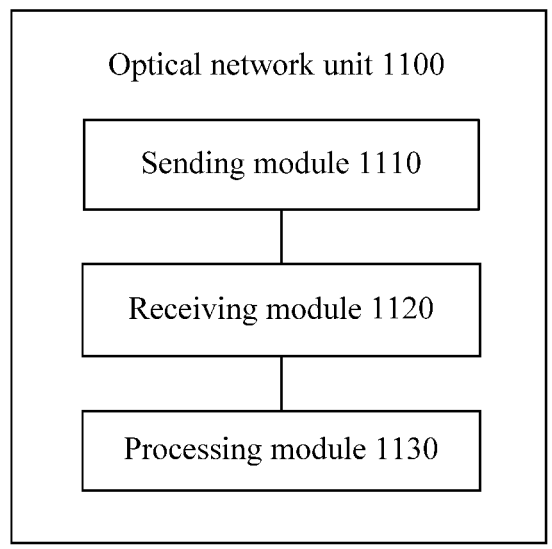
FIG. 11 shows an optical network unit in a PON system according to another embodiment of this application.

FIG. 11 shows an ONU 1100 in a PON system according to another embodiment of this application. The PON system includes an OLT and at least one ONU. As shown in FIG. 11, the ONU 1100 includes a sending module 1110, a receiving module 1120, and a processing module 1130.

The sending module 1110 is configured to send a first message to the OLT through a first upstream channel, where the first message is used by the OLT to determine a first round trip time RTT of the first ONU based on a receiving moment of the first message.

The receiving module 1120 is configured to receive first indication information sent by the OLT through a downstream channel, where the first indication information includes a time window, and the time window is determined by the OLT based on the first RTT.

The sending module 1110 is further configured to send a second message through a second upstream channel within the time window, where the second message is used by the OLT to determine a second RTT of the first ONU based on a receiving moment of the second message. In one embodiment, a frequency domain resource corresponding to the second upstream channel is different from a frequency domain resource corresponding to the first upstream channel.

The processing module 1130 is configured to register the ONU with the PON system based on the time window.

In one embodiment, the receiving module 1120 is further configured to:

receive second indication information sent by the OLT through the downstream channel, where the second indication information is used to instruct the first ONU to perform registration.

The sending module 1110 is configured to:

send, to the OLT through the first upstream channel, the first message that is in response to the second indication information.

In one embodiment, the processing module 1130 is configured to:

receive, by the first ONU, a compensation delay or a bandwidth grant that is sent by the OLT through the downstream channel, to complete a registration operation.

The modules in the ONU 1100 in one embodiment of this application may exist in the foregoing ONU 900. In other words, the ONU 1100 and the ONU 900 may implement this embodiment of this application in a form of combination of software and hardware. This is not limited.

The ONU 1100 according to one embodiment of this application may perform a method on a first-ONU side in the embodiments of this application, and the foregoing and other operations and/or functions of the modules in the ONU 1100 are separately used to implement corresponding procedures of the foregoing methods. For brevity, details are not described herein again.

Therefore, the ONU 1100 in one embodiment of this application sends the first message to the OLT, where the first message is used by the OLT to determine the first RTT of the first ONU; receives the time window sent by the first ONU; and performs registration within the time window, so that the OLT calculates the precise second RTT. Therefore, a delay caused by windowing activation can be effectively reduced.

A person of ordinary skill in the art may be aware that, in combination with the examples described in the embodiments disclosed in this specification, units and algorithm steps or operations can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, the function units in the embodiments may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps or operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely examples of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A method for communication in a passive optical network (PON) system, wherein the PON system comprises an optical line terminal (OLT) and at least one optical network unit (ONU), the method comprising:
   receiving, by the OLT, a first message that is sent by a first ONU in the at least one ONU through a first upstream channel;
   determining, by the OLT, a first round trip time (RTT) of the first ONU based on a receiving moment of the first message;
   determining, by the OLT, a time window based on the first RTT;
   sending, by the OLT, first indication information to the first ONU through a downstream channel, wherein the first indication information comprises the time window;
   receiving, by the OLT, a second message sent by the first ONU through a second upstream channel within the time window;
   determining, by the OLT, a second RTT of the first ONU based on a receiving moment of the second message; and
   completing, by the OLT, a registration operation of the first ONU based on the second RTT.

2. The method according to claim 1, wherein a frequency domain resource corresponding to the second upstream channel is different from a frequency domain resource corresponding to the first upstream channel.

3. The method according to claim 1, wherein, before the receiving, by the OLT, the first message sent by the first ONU in the at least one ONU through the first upstream channel, the method further comprises:
   sending, by the OLT, second indication information to the first ONU through the downstream channel, wherein the second indication information is used to instruct the first ONU to perform registration; and
   wherein, the receiving, by the OLT, the first message by the first ONU in the at least one ONU through the first upstream channel is in response to the second indication information.

4. The method according to claim 1, wherein, when the OLT sends the first indication information to the first ONU through the downstream channel, the method further comprises:
   sending, by the OLT, a grant resource to a second ONU in the at least one ONU through the downstream channel, wherein a time domain unit corresponding to the grant resource is staggered from a time domain unit corresponding to the time window; and
   receiving, by the OLT, upstream service data sent by the second ONU through the second upstream channel.

5. The method according to claim 1, wherein the completing, by the OLT, the registration operation of the first ONU based on the second RTT further comprises:

sending, by the OLT, a compensation delay or a bandwidth grant to the first ONU through the downstream channel based on the second RTT, such that the first ONU completes the registration operation.

6. The method according to claim 1, wherein the first message is an optical signal, and the optical signal carries a serial number (SN) or a media access control (MAC) address of the first ONU.

7. A method for communication in a passive optical network (PON) system, wherein the PON system comprises an optical line terminal (OLT) and at least one optical network unit (ONU), the method comprising:
  sending, by a first ONU in the at least one ONU, a first message to the OLT through a first upstream channel, wherein the first message is used by the OLT to determine a first round trip time (RTT) of the first ONU based on a receiving moment of the first message;
  receiving, by the first ONU, first indication information sent by the OLT through a downstream channel, wherein the first indication information comprises a time window, and the time window is determined by the OLT based on the first RTT;
  sending, by the first ONU, a second message through a second upstream channel within the time window, wherein the second message is used by the OLT to determine a second RTT of the first ONU based on a receiving moment of the second message; and
  registering, by the first ONU, with the PON system, based on the time window.

8. The method according to claim 7, wherein a frequency domain resource corresponding to the second upstream channel is different from a frequency domain resource corresponding to the first upstream channel.

9. The method according to claim 7, wherein before the sending, by the first ONU, the first message to the OLT through the first upstream channel, the method further comprises:
  receiving, by the first ONU, second indication information sent by the OLT through the downstream channel, wherein the second indication information is used to instruct the first ONU to perform registration; and
  wherein, the sending, by the first ONU, the first message to the OLT through the first upstream channel is in response to the second indication information.

10. The method according to claim 7, wherein the registering, by the first ONU, with the PON system based on the time window comprises:
  receiving, by the first ONU, a compensation delay or a bandwidth grant sent by the OLT through the downstream channel, to complete a registration operation.

11. An optical line terminal (OLT) in a passive optical network (PON) system, the PON system comprising the OLT and at least one optical network unit (ONU), the OLT comprising:
  a transmitter;
  a receiver; and
  a processor, wherein, the receiver and the transmitter are connected by using a wavelength division multiplexer, and wherein,
  the receiver is configured to receive a first message that is sent by a first ONU in the at least one ONU through a first upstream channel;
  the processor is configured to: determine a first round trip time (RTT) based on a receiving moment of the first message; and determine a time window based on the first RTT;
  the transmitter is configured to send first indication information to the first ONU through a downstream channel, wherein the first indication information comprises the time window;
  the receiver is further configured to receive a second message that is sent by the first ONU through a second upstream channel within the time window; and
  the processor is further configured to: determine a second RTT of the first ONU based on a receiving moment of the second message; and complete a registration operation of the first ONU based on the second RTT.

12. The OLT according to claim 11, wherein a frequency domain resource corresponding to the second upstream channel is different from a frequency domain resource corresponding to the first upstream channel.

13. The OLT according to claim 11, wherein the transmitter is further configured to:
  send second indication information to the first ONU through the downstream channel, wherein the second indication information is used to instruct the first ONU to perform registration; and
  wherein, the receiver is configured to receive the first message sent by the first ONU through the first upstream channel in response to the second indication information.

14. The OLT according to claim 11, wherein the transmitter is further configured to:
  send a grant resource to a second ONU in the at least one ONU through the downstream channel, wherein a time domain unit corresponding to the grant resource is staggered from a time domain unit corresponding to the time window; and
  the receiver is further configured to:
  receive upstream service data sent by the second ONU through the second upstream channel.

15. The OLT according to claim 11, wherein the processor is configured to:
  send a compensation delay or a bandwidth grant to the first ONU through the downstream channel based on the second RTT, such that the first ONU completes the registration operation.

16. The OLT according to claim 11, wherein the first message is an optical signal, and the optical signal carries a serial number (SN) or a media access control (MAC) address of the first ONU.

* * * * *